United States Patent
Koyama

(10) Patent No.: US 6,883,545 B2
(45) Date of Patent: Apr. 26, 2005

(54) THREE-WAY SWITCHING VALVE

(75) Inventor: Katsumi Koyama, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 133 days.

(21) Appl. No.: 10/457,540

(22) Filed: Jun. 10, 2003

(65) Prior Publication Data

US 2003/0230347 A1 Dec. 18, 2003

(30) Foreign Application Priority Data

Jun. 13, 2002 (JP) .................................. 2002-172823

(51) Int. Cl.$^7$ .......................................... F16K 11/20
(52) U.S. Cl. ..................................................... 137/885
(58) Field of Search ................................. 137/883, 885

(56) References Cited

U.S. PATENT DOCUMENTS

| | | | |
|---|---|---|---|
| 3,175,581 A | | 3/1965 | Brandenberg et al. . 137/596.15 |
| 3,894,561 A | | 7/1975 | Thornbery ............. 137/625.29 |
| 4,149,565 A | * | 4/1979 | Jennings et al. ............ 137/885 |
| 4,586,531 A | * | 5/1986 | Lindell ........................ 137/334 |
| 4,733,696 A | * | 3/1988 | Baun .......................... 137/883 |
| 4,816,083 A | * | 3/1989 | Bangyan .................... 137/271 |
| 4,909,279 A | * | 3/1990 | Nakamura et al. .......... 137/881 |

FOREIGN PATENT DOCUMENTS

| | | |
|---|---|---|
| FR | 1330663 | 6/1963 |
| JP | 62-110083 | 5/1987 |
| JP | 62-292973 | 12/1987 |
| JP | 04-272588 | 9/1992 |
| JP | 4-312276 | 11/1992 |

* cited by examiner

*Primary Examiner*—John Fox
(74) *Attorney, Agent, or Firm*—Westerman, Hattori, Daniels & Adrian, LLP

(57) ABSTRACT

The object of the present invention is to provide a three-way switching valve having a valve mechanism compact in size, and capable of changing a flow of a high-pressure fluid, without internal leakage of the fluid. A compact pilot-operated three-way switching valve changes a flow of a fluid introduced into an inlet port such that the fluid is caused to flow into a first outlet port or a second outlet port. Pressures in pressure-regulating chambers above pistons are selectively guided into a passage by a pilot valve having a pilot valve element, plugs including respective valve seats, and a spring. The passage leads one of the pressures to the first outlet port or the second outlet port via a check valve having valve, and a valve element. The check valve causes a very small amount of fluid permitted to flow so as to keep main valves open and closed, respectively, to flow to the downstream side of an open one of the main valves, whereby internal leakage of fluid is prevented.

14 Claims, 7 Drawing Sheets

THREE-WAY SWITCHING VALVE

CROSS-REFERENCES TO RELATED APPLICATIONS, IF ANY

This application claims priority of Japanese Application No. 2002-172823 filed on Jun. 13, 2002 and entitled "Three-Way Switching Valve".

BACKGROUND OF THE INVENTION (1) Field of the Invention

This invention relates to a three-way switching valve, and more particularly to a pilot-operated three-way switching valve for switching a flow path of a fluid through electromagnetic operation.

(2) Description of the Related Art

Conventionally, a three-way switching valve is known which operates to cause selective flow of a fluid supplied from a pump or the like toward two outlets. The three-way switching valve has two valve seats, and operates such that when one of the valve seats is closed, the other is opened. The opening and closing operations of the valve are carried out by actuating valve elements by a solenoid or a motor, or by using the difference between fluid pressures. Some three-way switching valves of the solenoid-operated type are configured to have two solenoids for actuating two valve elements alternately. Further, some of the type making use of the difference between pressures are required to introduce the difference between pressures on the discharge side and the suction side of a pump into a valve element or a portion for actuating the valve element, and some of the conventional three-way switching valves generate the differential pressure by connecting a capillary tube to the suction side of a pump.

On the other hand, a three-way switching valve is known e.g. from Japanese Unexamined Patent Publication No. 4-312276, which is configured to have one solenoid, and at the same time no external tube is provided so as to make its valve mechanism compact in size. The three-way switching valve forms a three-way solenoid valve having a solenoid and two valve elements arranged on the same axis and using a diaphragm pilot mechanism. When the solenoid is in a deenergized state, a pilot valve element formed on a plunger closes a pilot valve hole by the spring force, whereby a valve element on the solenoid side is closed, and a valve element on an opposite side of the solenoid is opened. Inversely, when the solenoid is energized, the pilot valve element is opened whereby a pressure in a diaphragm chamber is relieved to the downstream side of the valve to be opened, to thereby open the valve element on the solenoid side and at the same time close the valve element on the opposite side of the solenoid by the supplied fluid pressure.

However, the three-way switching valve constructed as above has a problem in durability especially when it is used for switching flow of a fluid having a very high pressure, since a diaphragm is employed in the pilot mechanism. In the three-way switching valve, to open and close the two valve elements in an interlocked fashion, a drive shaft is arranged such that it extends through a partition wall that separates two outlet passages. This causes a very small amount of leakage of the fluid through a portion slidably holding the drive shaft.

SUMMARY OF THE INVENTION

The present invention has been made in view of the above circumstances, and an object thereof is to provide a pilot-operated three-way switching valve having a valve mechanism compact in size, capable of switching between flow paths of a high-pressure fluid, and free from internal leakage of the fluid.

To solve the above problem, the present invention provides a pilot-operated three-way switching valve for changing a flow of a fluid introduced into an inlet port such that the fluid is caused to flow into a first outlet port or a second outlet port, characterized in that between a pilot valve for carrying out switching operation to cause one of respective pressure-regulating chambers for two pistons interlocked with two main valves to communicate with a low-pressure side, and the first outlet port and the second outlet port located on downstream sides of the main valves, there is provided a check valve that operates such that the pilot valve and a downstream side of an open one of the main valves are communicated with each other by a differential pressure between a pressure on a pilot valve side and a pressure on a downstream side of a closed one of the main valves.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is cross-sectional views showing the internal construction of the three-way switching valve according to the first embodiment, in a state with its solenoid being ON.

DESCRIPTION OF THE PREFERRED EMBODIMENTS

Hereinafter, embodiments of the present invention will be described in detail with reference to the drawings.

Figure 1:
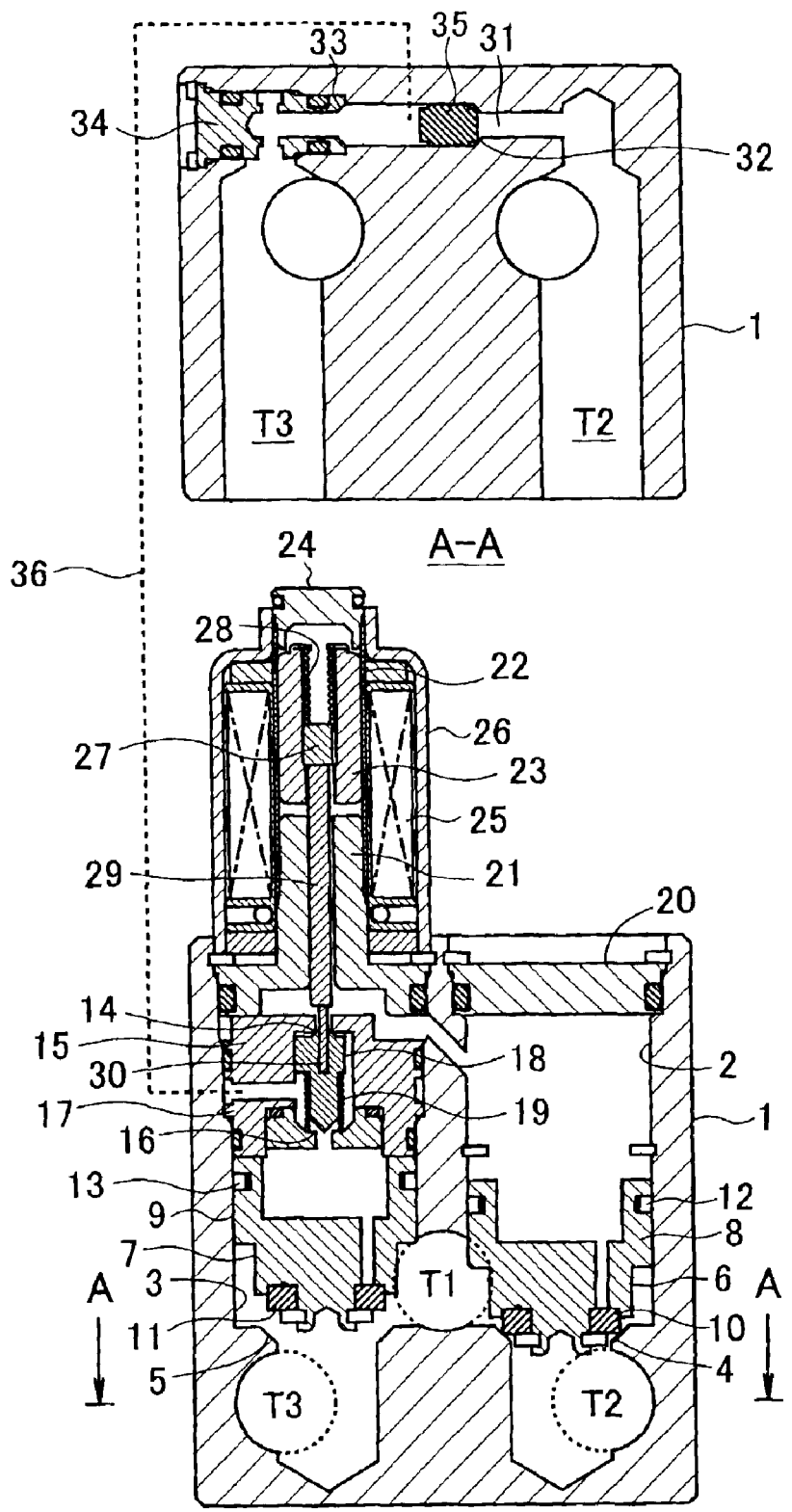
FIG. 1 is cross-sectional views showing the internal construction of a three-way switching valve according to a first embodiment of the invention, in a state with its solenoid being OFF.
Figure 2:
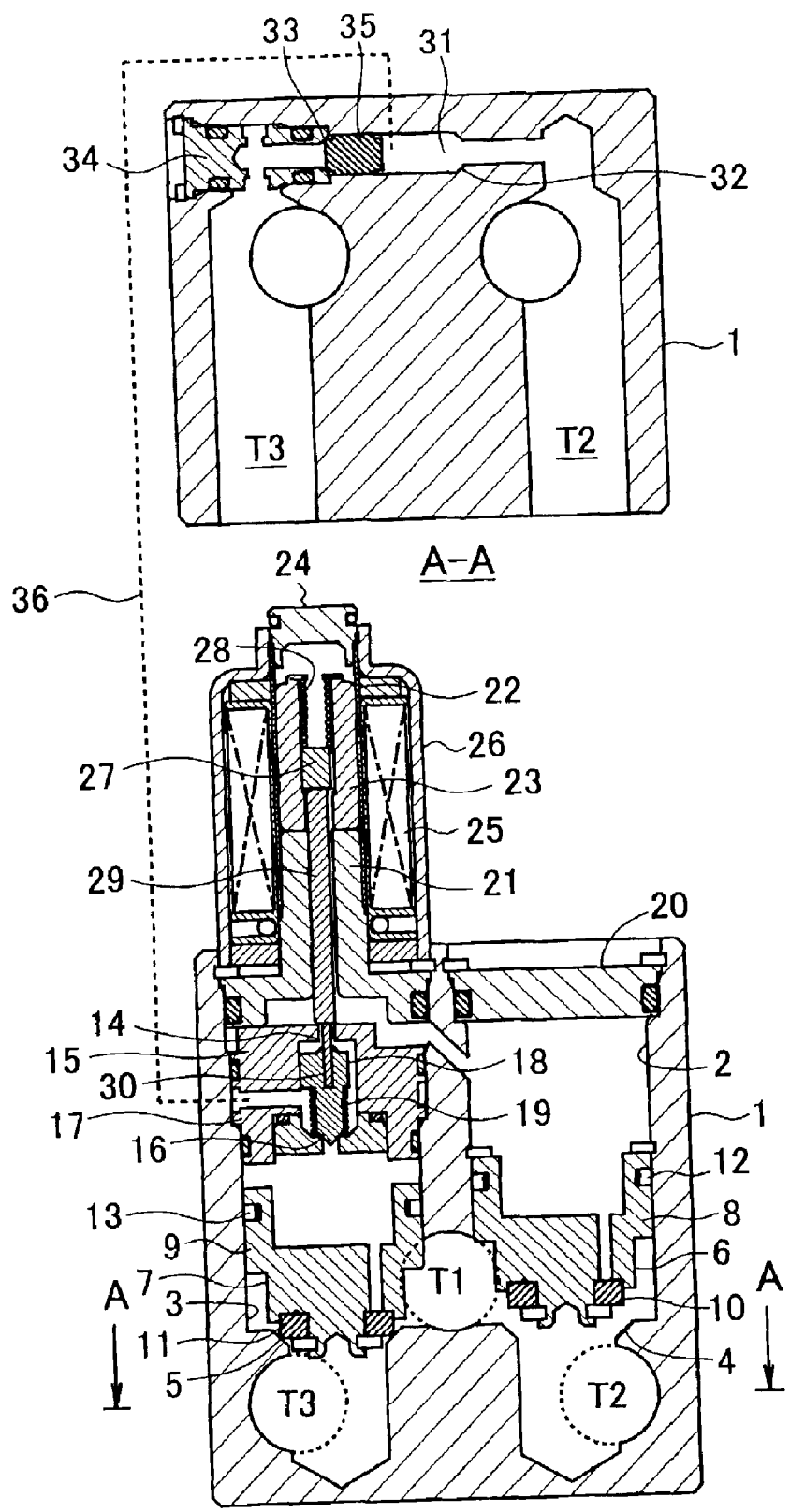
Figure 3:
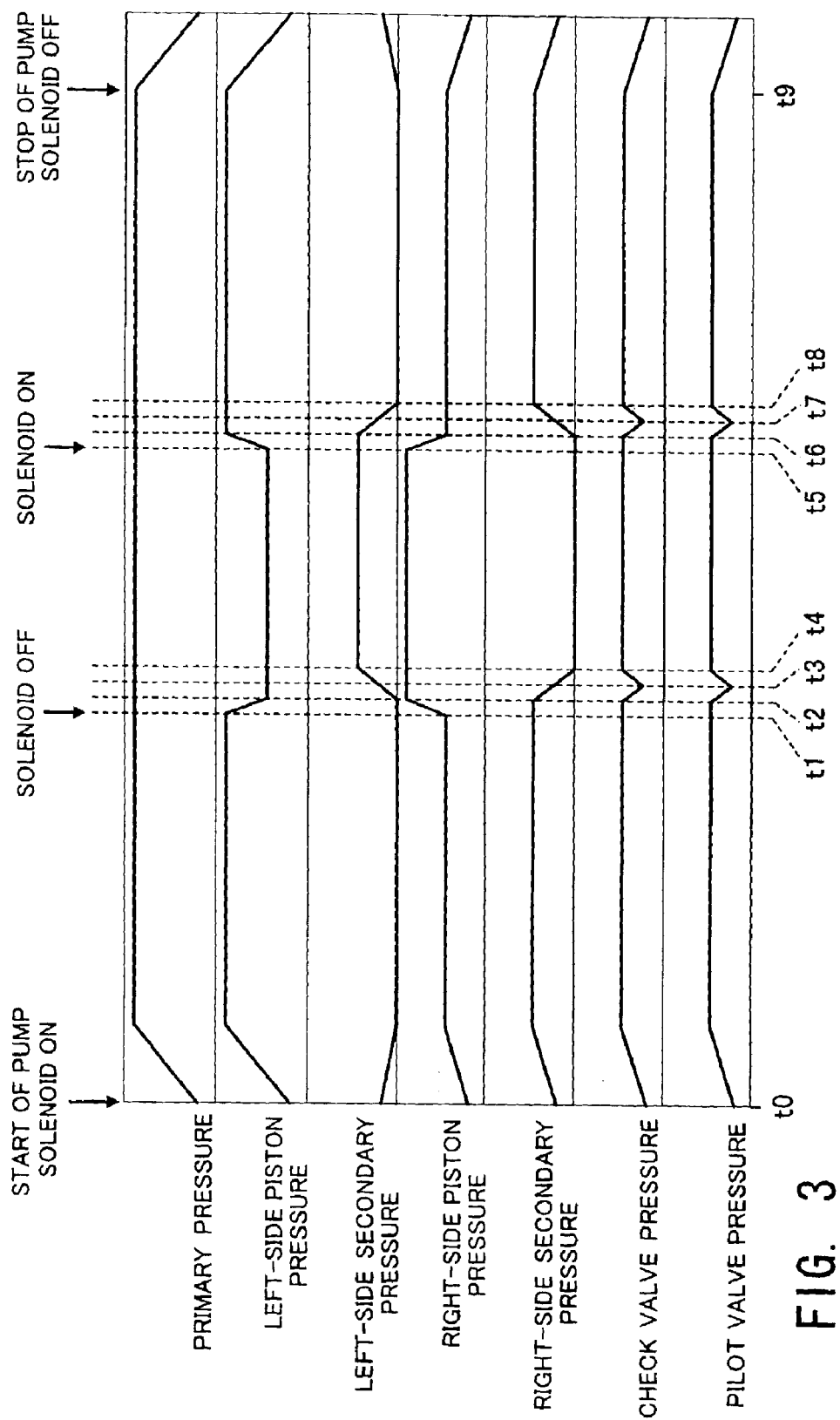
FIG. 3 is a time chart showing operating conditions of the three-way switching valve according to the first embodiment.

FIG. 1 provides cross-sectional views showing the internal construction of a three-way switching valve according to a first embodiment, in a state with its solenoid being OFF. FIG. 2 provides cross-sectional views showing the internal construction of the three-way switching valve according to the first embodiment, in a state with its solenoid being ON. FIG. 3 is a time chart showing operating conditions of the three-way switching valve according to the first embodiment.

The three-way switching valve has a body 1 through which two cylinder bores 2, 3 are formed for accommodating two main valves in parallel with each other on the left side and right side thereof as viewed in FIGS. 1 and 2. The body 1 has an inlet port T1 formed in the center thereof, for introducing a fluid such that the inlet port T1 communicates with both of the cylinder bores 2, 3. At respective locations downward of the cylinder bores 2, 3 are formed a first outlet port T2 and a second outlet port T3.

The cylinder bores 2, 3 have respective main valve seats 4, 5 integrally formed with the body 1 between the inlet port T1 and the first outlet port T2, and between the inlet port T1 and the second outlet port T3. Arranged in a manner opposed to the main valve seats 4, 5 are main valve elements 6, 7 which can move from the inlet port T1 side to and away from the main valve seats 4, 5. The main valve elements 6, 7 are integrally formed with pistons 8, 9 slidably arranged in the cylinder bores 2, 3, respectively. The pistons 8, 9 have larger pressure-receiving areas than those of the main valve elements 6, 7, respectively.

The main valve elements 6, 7 have seal rings 10, 11 rigidly fitted on portions thereof via which they are seated on the main valve seats 4, 5, by crimping via washers. The pistons 8, 9 have tension rings, and piston rings 12, 13 fitted in grooves formed in outer peripheries thereof, respectively. This causes a very small amount of fluid introduced from the inlet port T1 to flow into each of pressure-regulating chambers above the pistons 8, 9, via the piston rings 12, 13. It should be noted that the upward movement of the piston 8 on the right side in the cylinder bore 2 as viewed in the figures is limited by a C shaped snap ring fitted in the cylinder bore 2.

Above the piston 9 on the left side as viewed in the figures, there is arranged a pilot valve formed by a three-way valve. The pilot valve comprises a plug 15 including a valve seat 14 whose valve hole communicates with the pressure-regulating chamber above the right-side piston 8, a plug 17 including a valve seat 16 whose valve hole communicates with the pressure-regulating chamber above the left-side piston 9, a pilot valve element 18 in the form of a needle, whose both ends are arranged in a manner opposed to the valve seats 14, 16 such that the both ends can open and close the valve holes of the valve seats 14, 16, and a spring 19 for urging the pilot valve element 18 in a direction in which the pilot valve element 18 is seated on the valve seat 14.

The cylinder bore 2 formed on the right side of the body 1 has an upper opening closed by a cap 20, while the cylinder bore 3 formed on the left side of the same has an upper opening having a solenoid provided thereon for actuating the pilot valve.

The solenoid has a core 21 integrally formed with the body 1 such that the core 21 also serves as a lid for closing the upper opening of the body 1. The core 21 has an upper half thereof fitted in a sleeve 22. The sleeve 22 has a plunger 23 inserted therein, and has an upper end thereof closed by a cap 24. A solenoid coil 25 is arranged on the outer periphery of the sleeve 22 and surrounded by a yoke 26.

The core 21 and the plunger 23 have a through hole extending along a central axis thereof. The through hole of the plunger 23 has a stepped portion at an intermediate part thereof such that an upper part of the hole has a larger diameter than that of a lower part thereof. The upper part of the hole having the larger diameter accommodates a holder 27 and a spring 28 for urging the holder 27 in a direction in which the holder 27 is brought into abutment with the stepped portion. A shaft 29 is disposed in the lower part of the hole of the plunger 23 having a smaller diameter and the trough hole of the core 21. The shaft 29 has an upper end thereof brought into abutment with the holder 27, and a lower end thereof brought into abutment with a shaft 30 which is rigidly fixed to the pilot valve element 18 and extends through the valve hole of the valve seat 14.

A space containing the pilot valve element 18 is communicated with a check valve shown in a cross-sectional view of the body 1 taken on line A—A of each figure and depicted in an upper part thereof. The check valve includes a passage 31 communicating between the first outlet port T2 and the second outlet port T3, and a valve seat 32 of the check valve is integrally formed with the body 1 on the first outlet port side of the passage 31. On the second outlet port side of the passage 31 is arranged a plug 34 that forms a valve seat 33. A space in the passage 31 between the valve seat 32 and valve seat 33 communicates with the space containing the pilot valve element 18 via a passage 36 indicated by a dotted line. A valve element 35 is arranged such that it can be seated on either of the valve seats 32, 33.

In the three-way switching valve constructed as above, when the solenoid coil 25 is in a deenergized state, i.e. when the solenoid is OFF, with no fluid being introduced into the inlet port T1, no solenoid force for actuating the pilot valve is generated, so that the pilot valve element 18 is pushed upward as viewed in FIGS. 1 and 2 by the spring 19, whereby it is seated on the valve seat 14. This causes an upper portion of the pilot valve to be closed, and a lower portion thereof to be opened. As a result, the pressure-regulating chamber above the right-side piston 8 is closed by the pilot valve, while the pressure-regulating chamber above the left-side piston 9 communicates with the check valve via the pilot valve and the passage 36. At this time, although the main valve element 6 and the piston 8, and the main valve element 7 and the piston 9 can assume arbitrary positions, it is assumed here that the main valve elements 6, 7 are seated on the main valve seats 4, 5, respectively, e.g. due to their own weights. Further, the valve element 35 of the check valve is put in a position taken when the supply of the fluid was stopped.

When the fluid is introduced into the inlet port T1 with the solenoid being OFF, the pressure of the fluid is introduced into the pressure-regulating chambers above the pistons 8, 9 via the piston rings 12, 13 provided on the left-side and right-side pistons 8, 9. The pressure-regulating chamber above the right-side piston 8 is closed by the pilot valve, while the pressure-regulating chamber above the left-side piston 9 communicates with the first outlet port T2 and the second outlet port T3 via the pilot valve and the check valve. Therefore, the pressure in the pressure-regulating chamber above the right-side piston 8 becomes high, whereas the pressure in the pressure-regulating chamber above the left-side piston 9 becomes low since the amount of fluid caused to flow out into the first outlet port T2 or the second outlet port T3 is larger than the amount of fluid introduced from the inlet port T1. The right-side piston 8 is designed to have a larger pressure-receiving area than that of the main valve element 6, and hence the piston 8 and the main valve element 6 are pushed downward by the difference between pressures applied to the piston 8 and the main valve element 6 to be brought to the state illustrated in FIG. 1. Further, since the pressure on the side of the main valve element 7 is high and the pressure within the pressure-regulating chamber above the left-side piston 9 is low, the left-side piston 9 and the main valve element 7 are pushed upward, and as shown in FIG. 1, the main valve in the cylinder bore 3 is opened. As a result, in the check valve, the pressure in the first outlet port T2 becomes low, and the pressure in the second outlet port T3 becomes high, so that the valve element 35 of the check valve is seated on the right-side valve seat 32 on the low-pressure side, to block communication between the first outlet port T2 and the second outlet port T3. Thus, the check valve is brought to the state illustrated in FIG. 1.

Next, when the solenoid is turned ON, first, the plunger 23 is pulled and attracted by the core 21. As the plunger 23 is pulled by the core 21, the holder 27 is pushed down toward the stepped portion in the plunger 23 by the urging force of the spring 28. This causes the holder 27 to push the shaft 29 downward, thereby pushing down the shaft 30 rigidly fixed to the pilot valve element 18. Consequently, the pilot valve element 18 is pushed downward against the urging force of the spring 19 to be seated on the lower valve seat 16. That is, the pilot valve element 18 is seated on the lower valve seat 16 by the plunger-attracting operation, and thereafter, the pilot valve element 18 is held in the state seated on the lower valve seat 16, by the urging force of the spring 28 within the plunger 23. This causes the upper portion of the pilot valve to be opened, and the lower portion thereof to be closed.

As a result, the pressure-regulating chamber above the right-side piston 8 communicates with the second outlet port T3 via the pilot valve, the passage 36, and the check valve. Since the fluid flows from the inlet port T1 to the second outlet port T3 to thereby cause a pressure loss therebetween, the pressure in the second outlet port T3 becomes lower than that of the inlet port T1, which acts to reduce the pressure in the pressure-regulating chamber above the right-side piston 8 to a pressure as low as that of the second outlet port T3. On the other hand, there is no path for relieving the pressure in the pressure-regulating chamber above the left-side piston 9, so that the pressure in this chamber is increased to push the piston 9 downward. This closes the left-side main valve element 7 to reduce the pressure in the second outlet port T3 so that the pressure within the pressure-regulating chamber above the right-side piston 8 is sharply reduced. This causes the right-side piston 8 to be moved upward, as viewed in the figure, by the difference between the pressure in the pressure-regulating chamber above the right-side piston 8 and that of the inlet port T1, whereby the right-side main valve element 6 is opened. Simultaneously, since the pressure in the first outlet port T2 becomes high, and the pressure in the second outlet port T3 becomes low, the valve element 35 of the check valve is seated on the left-side valve seat 33 on the low-pressure side, and a route is formed for relieving the pressure in the pressure-regulating chamber above the right-side piston 8 to the first outlet port T2 on a side where the check valve is opened. As a result, the three-way switching valve is brought to the state illustrated in FIG. 2.

Now, changes in pressure conditions in the three-way switching valve will be described with reference to FIG. 3. It is assumed here that in a closed fluid circuit, the inlet port T1 of the three-way switching valve is connected to the discharge side of a pump, while the first and second outlet ports T2, T3 of the valve are connected to the suction side of the pump. In FIG. 3, the pressure of a fluid introduced into the inlet port T1 is represented by a primary pressure, the pressure in the pressure-regulating chamber above the left-side piston 9 is represented by a left-side piston pressure, the pressure in the second outlet port T3 on the downstream side of the left-side main valve is represented by a left-side secondary pressure, the pressure in the pressure-regulating chamber above the right-side piston 8 is represented by a right-side piston pressure, the pressure in the first outlet port T2 on the downstream side of the right-side main valve is represented by a right-side secondary pressure, the pressure in the central chamber accommodating the valve element 35 within the check valve is represented by a check valve pressure, and the pressure in a central chamber accommodating the pilot valve element 18 within the pilot valve is represented by a pilot valve pressure. Further, the ordinate represents a change in each of the above pressures, and the abscissa represents lapse of time.

First, let it be assumed that at a time t0, the pump for supplying the fluid to the three-way switching valve is started, and at the same time the solenoid is turned ON. As the pressure of the fluid is increased by the start of the pump, the primary pressure is also increased. Simultaneously, since the pressure-regulating chamber above the left-side piston 9 is in a state closed by the pilot valve actuated by the solenoid, the left-side piston pressure as well is increased similarly, and both of the primary pressure and the left-side piston pressure become stable at their highest pressures.

During the increases in the pressures, if the second outlet port T3 on the closed chamber side is under suction by the pump, the left-side secondary pressure has its residual pressure decreased. Further, the right-side piston pressure, the right-side secondary pressure, the check valve pressure, and the pilot valve pressure are each increased to a level obtained by subtracting a pressure loss caused by flow of the fluid passing through the right-side main valve from the primary pressure.

When the solenoid is turned OFF at a time t1, although the primary pressure is not changed, the pressure-regulating chamber above the left-side piston 9 is communicated with the second outlet port T3, whereby the left-side piston pressure attempts to be equal to the secondary pressure of the second outlet port T3, and hence is decreased. At the same time, since the pressure-regulating chamber above the right-side piston 8 is closed by the pilot valve, the right-side piston pressure is increased attempting to become equal to the primary pressure.

At a time t2, when the left-side piston pressure becomes equal to the secondary pressure of the second outlet port T3, and the right-side piston pressure becomes equal to the primary pressure, the right-side main valve is closed, and the left-side main valve is opened. This inverts the secondary pressure of the first outlet port T2 and the secondary pressure of the second outlet port T3, and hence the valve element 35 of the check valve is moved from left to right. At this time, since the first outlet port T2 and the second outlet port T3 temporarily communicate with each other via the passage 31 accommodating the valve element 35, the check valve pressure and the pilot valve pressure are reduced (time t3) during switching operation of the check valve, and return to the secondary pressure of the open left-side main valve again (time t4). During switching operation of the check valve (t2 to t4), the left-side secondary pressure is increased to the pressure obtained by subtracting the pressure loss from the primary pressure, and the right-side secondary pressure is reduced to the suction pressure of the pump.

At a time t5, when the solenoid is turned ON again, first, the left-side piston pressure is increased to the primary pressure, and the right-side piston pressure is reduced to the secondary pressure of the right-side main valve. Now, when the right-side main valve is opened, and the left-side main valve is closed, during a time period t6 to t8 over which switching operation of the check valve is carried out, the left-side secondary pressure is reduced to the suction pressure of the pump, and the right-side secondary pressure is increased to the level obtained by subtracting the pressure loss from the primary pressure. The check valve pressure and the pilot valve pressure are temporarily reduced, respectively.

At a time t9, when the pump is stopped, and the solenoid is turned OFF, the primary pressure, the left-side piston pressure, the right-side piston pressure, the right-side secondary pressure, the check valve pressure, and the pilot valve pressure are reduced, and the left-side secondary pressure is increased, whereby all the pressures become equal to each other.

Figure 4:
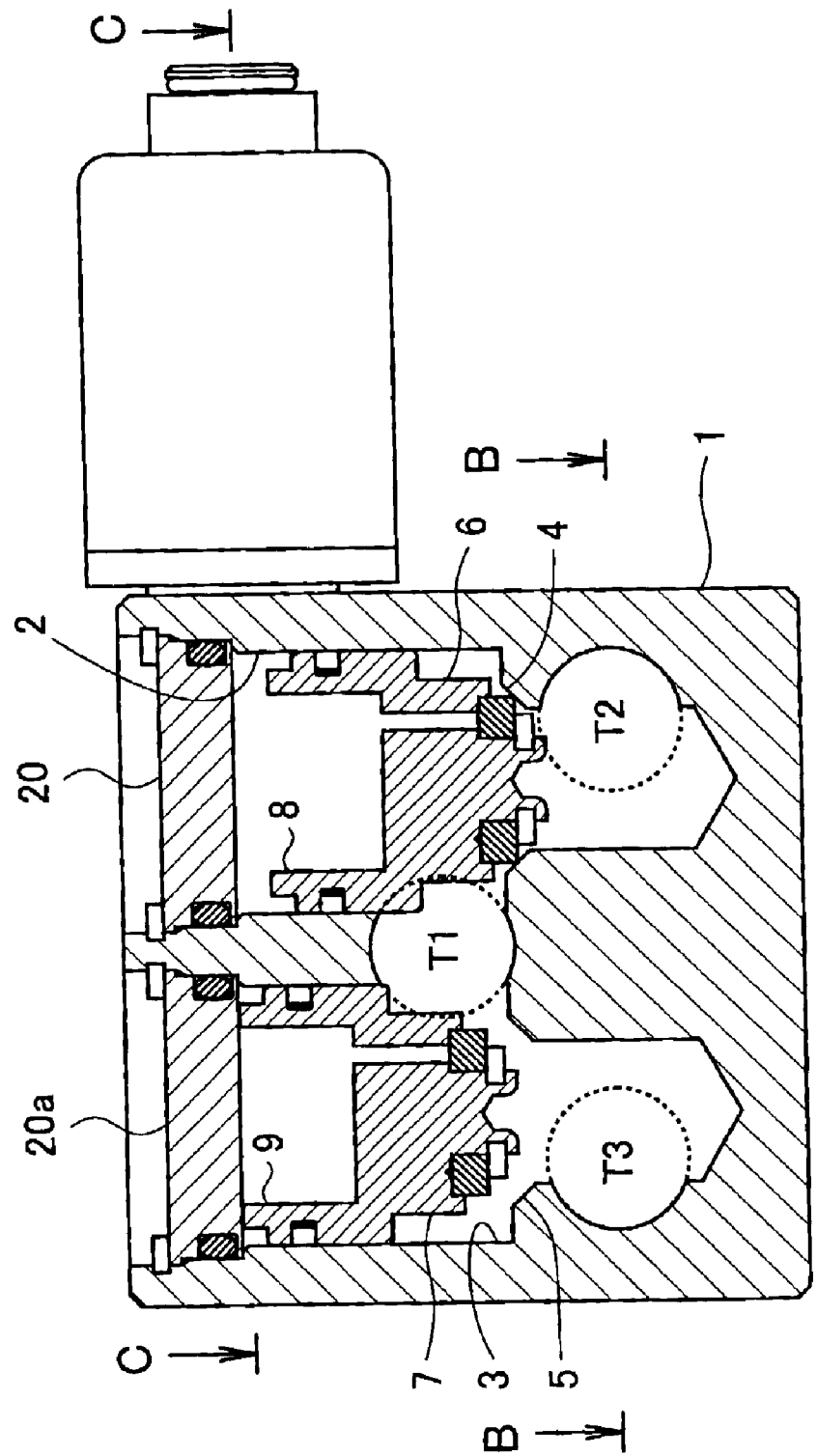
FIG. 4 is a cross-sectional view showing the internal construction of a three-way switching valve according to a second embodiment of the invention.
Figure 5:
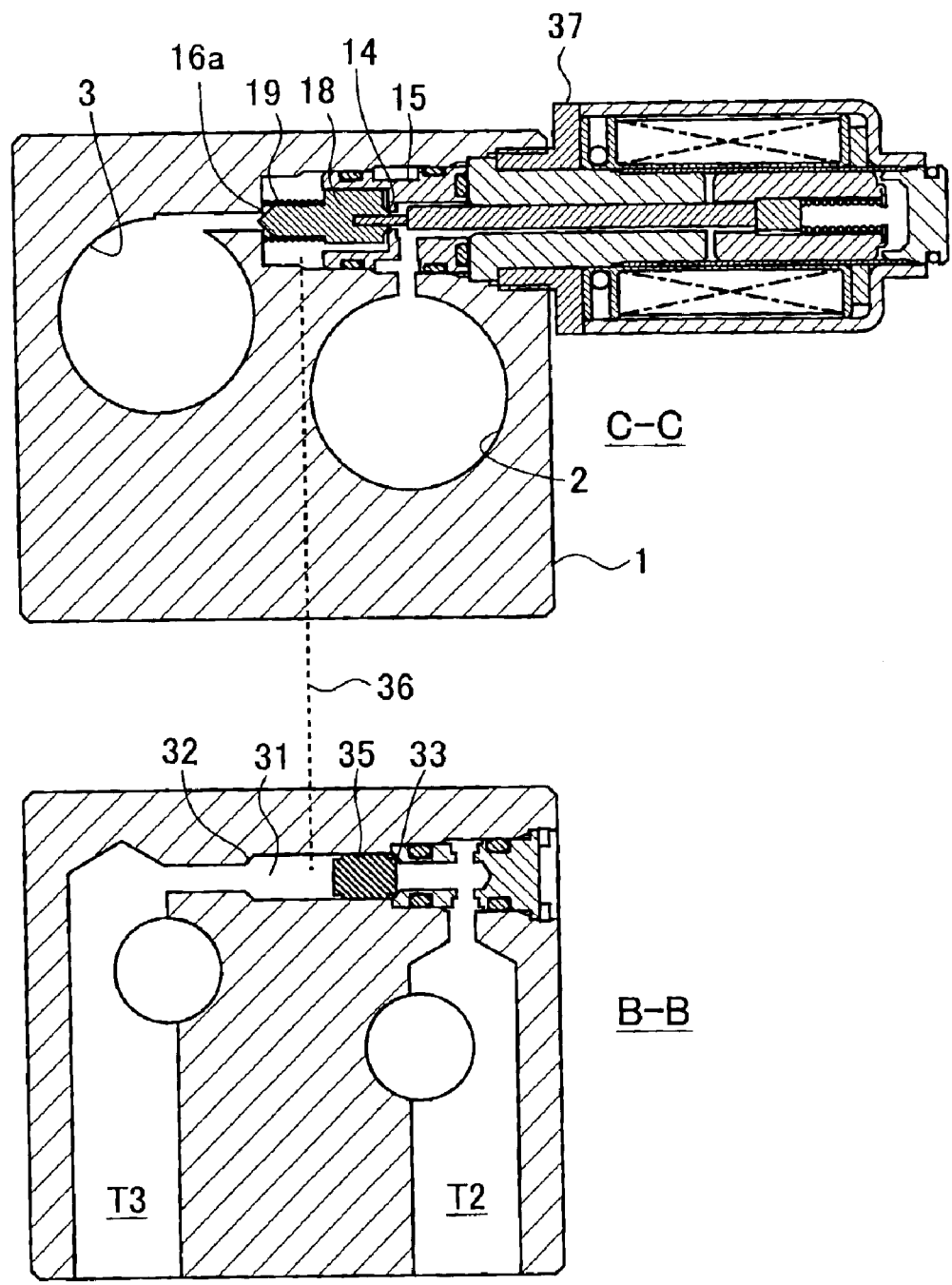
FIG. 5 is cross-sectional views taken on line B—B of FIG. 4, and taken on line C—C of the same.

FIG. 4 is a cross-sectional view showing the internal construction of a three-way switching valve according to a second embodiment. FIG. 5 provides a cross-sectional view taken on line B—B of FIG. 4, and a cross-sectional view taken on line C—C of the same. In FIGS. 4 and 5, component parts and elements similar to those of the three-way switching valve shown in FIGS. 1 and 2 are designated by identical reference numerals, and detailed description thereof is omitted.

The three-way switching valve according to the second embodiment is configured to be of a type in which a solenoid and a pilot valve are inserted from a lateral side of a body 1 to reduce the height of the valve. More specifically, cylinder bores 2, 3 formed in the body 1 have upper openings closed by caps 20, 20a, respectively. The body 1 has an insertion hole formed in the side thereof, for inserting the solenoid and the pilot valve therein. The pilot valve comprises a plug 15 inserted into the insertion hole and having a valve seat 14, a valve seat 16a integrally formed with the body 1 and having a valve hole communicating with the cylinder bore 3, and a pilot valve element 18 and a spring 19 disposed between the valve seats 14, 16a. The plug 15 is formed such that a valve hole of the valve seat 14 on the solenoid side communicates with the cylinder bore 2. The solenoid is screwed into an inlet of the insertion hole by a connecting member 37 forming part of a magnetic circuit. A space accommodating the pilot valve element 18 communicates with a passage 36 to communicate with a space between valve seats 32, 33 of a check valve.

In the three-way switching valve constructed as above, operation thereof is similar to that of the three-way switching valve according to the first embodiment. More specifically, when the solenoid is OFF, a pressure-regulating chamber above a right-side piston 8 is closed by the pilot valve, and a pressure-regulating chamber above a left-side piston 9 communicates with the check valve for relieving the pressure of a fluid to a low-pressure side via the pilot valve and the passage 36. Accordingly, the right-side piston 8 causes a main valve element 6 to be seated on a main valve seat 4, while the left-side piston 9 causes a main valve element 7 to move away from a main valve seat 5. As a result, a main valve between an inlet port T1 and a first outlet port T2 is closed, and a main valve between the inlet port T1 and a second outlet port T3 is opened. In the check valve, a valve element 35 is seated on a valve seat 33 which is located on a side where the pressure is reduced due to closing a main valve by the differential pressure of the fluid between the first outlet port T2 and the second outlet port T3. Thus, the pilot valve and the second outlet port T3 on the downstream side of the open main valve are communicated with each other by the check valve.

When the solenoid is ON, the pilot valve inverts the respective pressures in the pressure-regulating chambers above the pistons 8, 9 to open the right-side main valve and close the left-side main valve. This inverts the pressure of the first outlet port T2 and that of the second outlet port T3 in magnitude, so that the check valve closes a side communicating with the second outlet port T3, and applies a pressure reduced by the amount of a pressure loss caused by flow of the fluid through the right-side main valve to the pressure-regulating chamber above the right-side piston 8 integrally formed with the right-side main valve, thereby keeping the right-side main valve open, and the left-side main valve closed.

Figure 6:
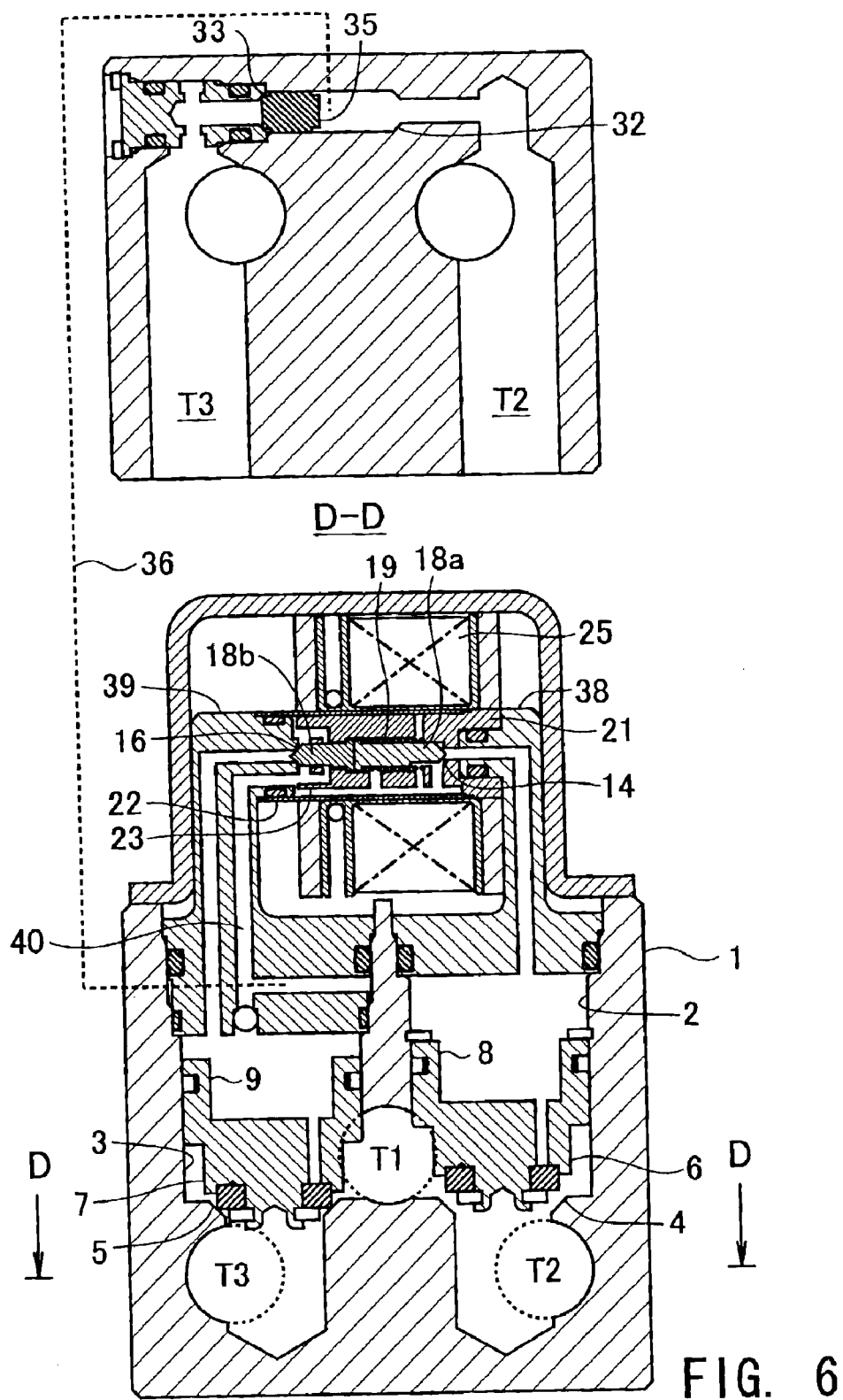
FIG. 6 is cross-sectional views showing the internal construction of a three-way switching valve according to a third embodiment of the invention.

FIG. 6 is a cross-sectional view showing the internal construction of a three-way switching valve according to a third embodiment. In the figure, component parts and elements similar to those of the three-way switching valve shown in FIGS. 1 and 2 are designated by identical reference numerals, and detailed description thereof is omitted.

In the three-way switching valve according to the third embodiment, a solenoid and a pilot valve are laterally arranged on top of a body 1 in a manner bridging over two cylinder bores 2, 3, and the pilot valve is contained in the solenoid.

The solenoid has a core 21 fitted in one end of a sleeve 22, and a plunger 23 inserted into the sleeve 22. The core 21 has a valve hole formed therethrough along the axis thereof such that a valve seat 14 of the pilot valve is formed. The valve hole is communicated with a pressure-regulating chamber above a right-side piston 8 via a connecting member 38. In the other end of the sleeve 22 is fitted one end of a connecting member 39 having a valve hole formed therethrough such that a valve seat 16 of the pilot valve is formed. The other end of the connecting member 39 is fitted in an upper opening of the left-side cylinder bore 3. The connecting member 39 causes the valve hole of the valve seat 16 to communicate with a pressure-regulating chamber above a left-side piston 9 such that the valve seat 16 is formed. Further, the connecting member 39 includes a passage 40 communicating with a space within the sleeve 22 having the plunger 23 loosely fitted therein. The passage 40 communicates with a check valve through a passage 36.

The plunger 23 has pilot valve elements 18a, 18b arranged along the axis thereof. The pilot valve element 18a has a flange on an opposite side of a needle facing the valve seat 14, and a spring 19 is arranged between the flange and the core 21. The pilot valve element 18b has a flange on an opposite side of a needle facing the valve seat 16. The flange is held in the plunger 23. Therefore, when a solenoid coil 25 is in a deenergized state, the plunger 23 and the pilot valve elements 18a, 18b are urged leftward, as viewed in the figure, by the spring 19, whereby the pilot valve causes the pressure-regulating chamber above the right-side piston 8 to communicate with the check valve, and closes the pressure-regulating chamber above the left-side piston 9. When the solenoid coil 25 is in an energized state, the plunger 23 is attracted by the core 21 against the urging force of the spring 19, and the pilot valve elements 18a, 18b are urged rightward, as viewed in the figure, in a manner interlocked with the attracting operation. Therefore, the pilot valve closes the pressure-regulating chamber above the right-side piston 8, and causes the pressure-regulating chamber above the left-side piston 9 to communicate with the check valve.

In the three-way switching valve constructed as above, operation thereof is substantially similar to that of the three-way switching valve according to the first embodiment, although left-side and right-side main valves thereof are opened and closed inversely to those of the first embodiment. More specifically, when the solenoid is OFF, the pressure-regulating chamber above the right-side piston 8 communicates with the check valve for relieving the pressure of a fluid to the low-pressure side, via the pilot valve and the passage 36, and the pressure-regulating chamber above the left-side piston 9 is closed by the pilot valve. Therefore, the right-side piston 8 causes a main valve element 6 to move away from a main valve seat 4, while the left-side piston 9 causes a main valve element 7 to be seated on a main valve seat 5. As a result, a main valve between an inlet port T1 and a first outlet port T2 is opened, and a main valve between the inlet port T1 and a second outlet port T3 is closed. In the check valve, a valve element 35 is seated on a valve seat 33 on a side where the pressure is reduced by closing of a main valve by a differential pressure between the first outlet port T2 and the second outlet port T3. Thus, the pilot valve and the first outlet port T2 on the downstream side of the open main valve are communicated with each other by the check valve.

When the solenoid is ON, the pilot valve inverts pressures in the pressure-regulating chambers above the pistons 8, 9 to close the right-side main valve and open the left-side main valve. This inverts the pressure of the first outlet port T2 and that of the second outlet port T3 in magnitude, so that the check valve closes a side communicating with the first outlet port T2, and applies a pressure reduced by the amount of a pressure loss caused by the flow of the fluid through the left-side main valve to the pressure-regulating chamber above the left-side piston 9 integrally formed with the left-side main valve, thereby keeping the right-side main valve closed, and the left-side main valve open.

Figure 7:
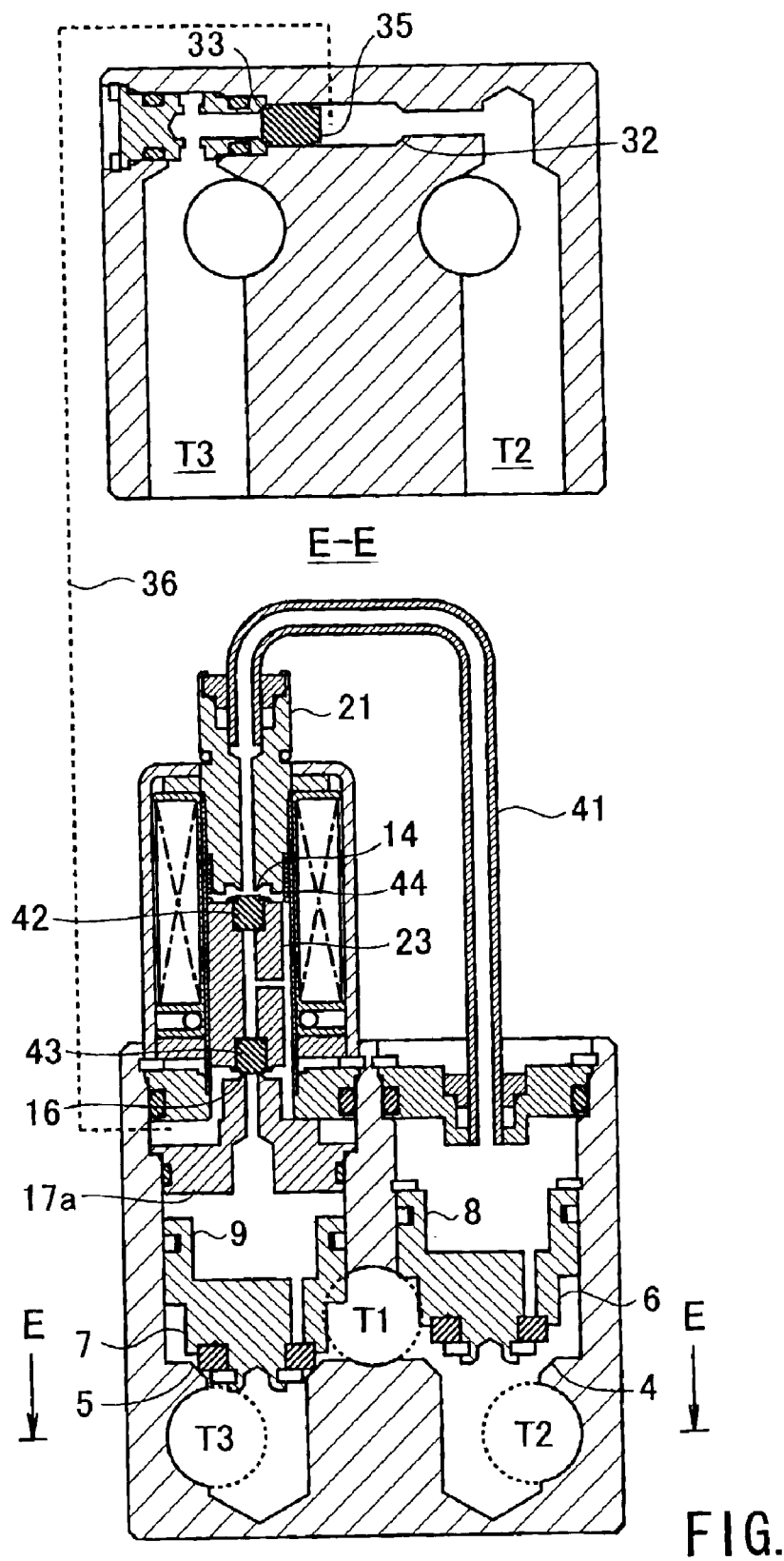
FIG. 7 is cross-sectional views showing the internal construction of a three-way switching valve according to a fourth embodiment of the invention.

FIG. 7 is a cross-sectional view showing the internal construction of a three-way switching valve according to a fourth embodiment. In the figure, component parts and elements similar to those of the three-way switching valve shown in FIGS. 1 and 2 are designated by identical reference numerals, and detailed description thereof is omitted.

Although in the three-way switching valves according to the first and second embodiments, the passage communicating between the pilot valve and the pressure-regulating chamber above the right-side piston 8 is formed in the body 1, and in the three-way switching valve according to the third embodiment, the passage is formed in the connecting member 38, the three-way switching valve according to the fourth embodiment is configured such that a pilot valve and a pressure-regulating chamber above a right-side piston 8 are connected with each other by a tube 41. Further, the pilot valve is integrally formed with the solenoid, similarly to the three-way switching valve according to the third embodiment.

The pilot valve includes valve sheets 42, 43 disposed in both end faces of the plunger 23, respectively, and valve seats 14, 16 opposed to the valve sheets 42, 43, respectively. The upper valve seat 14, as viewed in the figure, is integrally formed with a core 21, and a valve hole in the core 21 communicates with the pressure-regulating chamber above the right-side piston 8 through a tube 41. The lower valve seat 16, as viewed in the figure, is integrally formed with a plug 17a disposed above a left-side piston 9, and a valve hole in the plug 17a communicates with a pressure-regulating chamber above the left-side piston 9. A space between the valve seat 14 and the valve seat 16 communicates with a check valve via a passage 36. Further, the plunger 23 also playing the role of a pilot valve element is urged by a spring 44 in a direction in which it moves away from the core 21.

In the three-way switching valve constructed as above, operation thereof is substantially similar to that of the three-way switching valve according to the first embodiment, although left-side and right-side main valves thereof are opened and closed inversely to those of the first embodiment. More specifically, when the solenoid is OFF, the pressure-regulating chamber above the right-side piston 8 communicates with the check valve for relieving the pressure of a fluid to the low-pressure side, via the pilot valve and the passage 36, and the pressure-regulating chamber above the left-side piston 9 is closed by the pilot valve. Therefore, the right-side piston 8 causes a main valve element 6 to move away from a main valve seat 4, while the left-side piston 9 causes a main valve element 7 to be seated on a main valve seat 5. This opens a main valve between an inlet port T1 and a first outlet port T2, and closes a main valve between the inlet port T1 and a second outlet port T3. In the check valve, a valve element 35 is seated on a valve seat 33 on a side where the pressure is reduced by closing of a main valve by the differential pressure between the first outlet port T2 and the second outlet port T3. Thus, the pilot valve and the first outlet port T2 on the downstream side of the open main valve are communicated with each other by the check valve.

When the solenoid is ON, the pilot valve inverts pressures in the pressure-regulating chambers above the pistons 8, 9 to close the right-side main valve and open the left-side main valve. This inverts the pressure of the first outlet port T2 and that of the second outlet port T3 in magnitude, so that the check valve closes a side communicating with the first outlet port T2, and applies a pressure reduced by the amount of a pressure loss caused by the flow of the fluid through the left-side main valve to the pressure-regulating chamber above the left-side piston 9 integrally formed with the left-side main valve, thereby keeping the right-side main valve closed, and the left-side main valve open.

Although in the above embodiments, the seal rings provided for enhancing the sealing performance of the main valves are arranged on the main valve elements, they may be provided on the main valve seats.

As described above, according to the present invention, the three-way switching valve is configured such that a check valve is provided on the downstream side of a pilot valve used for selectively relieving pressures in respective pressure-regulating chambers for pistons to a low-pressure side, and the check valve provides communication to the down stream side of an open one of main valves. Due to this configuration, a very small amount of fluid permitted to flow to keep the main valves open and closed, respectively, is caused to flow to the downstream side of the open main valve via the pilot valve and the check valve. This prevents internal leakage of the fluid within the three-way switching valve.

Further, one of the pressure-regulating chambers above the piston integrally formed with the open main valve has a pressure equal to a secondary pressure lower than a primary pressure of the fluid in an inlet port by the amount of a pressure loss caused by the flow of the fluid through the main valve to an outlet port. The differential pressure of the fluid enables a main valve to maintain opening operation.

Further, only a small differential pressure between the primary pressure and secondary pressure of the fluid, corresponding to the amount of the pressure loss, is applied to the pilot valve, which requires only a very small solenoid force for actuating a pilot valve element. This makes it possible to make the solenoid compact in size.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A pilot-operated three-way switching valve for changing a flow of a fluid introduced into an inlet port such that the fluid is caused to flow into a first outlet port or a second outlet port, characterized in that between a pilot valve for carrying out switching operation to cause one of respective pressure-regulating chambers for two pistons interlocked with two main valves to communicate with a low-pressure side, and the first outlet port and the second outlet port located on downstream sides of the main valves, there is provided a check valve that operates such that the pilot valve and a downstream side of an open one of the main valves are communicated with each other by a differential pressure between a pressure on a pilot valve side and a pressure on a downstream side of a closed one of the main valves.

2. The three-way switching valve according to claim 1, wherein the check valve includes a passage formed between spaces communicating with the first outlet port and the second outlet port and having valve seats arranged on both end sides thereof, and a plug disposed as valve elements associated with the valve seats in a chamber communicating with the pilot valve and defined between the valve seats arranged in the passage.

3. A three-way switching valve for changing a flow of a fluid introduced into an inlet port such that the fluid is caused to flow into a first outlet port or a second outlet port, characterized by comprising:

a first main valve disposed between the inlet port and the first outlet port, for opening and closing therebetween;

a second main valve disposed between the inlet port and the second outlet port, for opening and closing therebetween;

a first piston having a larger pressure-receiving area than that of a first main valve element of the first main valve, and operating in conjunction with the first main valve element in directions of opening and closing operations of the first main valve element;

a second piston having a larger pressure-receiving area than that of a second main valve element of the second main valve, and operating in conjunction with the second main valve element in directions of opening and closing operations of the second main valve element;

a check valve disposed between the first outlet port and the second outlet port, for operation such that a passage leading to a downstream side of a closed one of the first and second main valves is closed;

a pilot valve for carrying out switching operation to selectively communicate the check valve with respective pressure-regulating chambers for the first piston and the second piston; and a solenoid for actuating a pilot valve element of the pilot valve to switch the pilot valve.

4. The three-way switching valve according to claim 3, wherein the check valve includes a passage formed between spaces communicating with the first outlet port and the second outlet port and having valve seats arranged on both end sides thereof, and a plug disposed as valve elements associated with the valve seats in a chamber communicating with the pilot valve and defined between the valve seats arranged in the passage, the plug operating such that the passage leading to the downstream side of the closed one of the first and second main valves is closed by a differential pressure between a pressure on a pilot valve side and a pressure on the downstream side of the closed one of the first and second main valves.

5. The three-way switching valve according to claim 3, wherein the first and second main valves have flexible sealing materials at seating portions of either the main valve elements or main valve seats.

6. The three-way switching valve according to claim 3, wherein the first and second pistons are integrally formed with the main valve elements of the first and second main valves, respectively.

7. The three-way switching valve according to claim 3, wherein the first and second pistons have respective piston rings formed along circumferences thereof such that a pressure of the fluid in the inlet port is introduced into the pressure-regulating chambers via the piston rings, respectively.

8. The three-way switching valve according to claim 3, wherein the pilot valve includes a pilot valve element for causing one of the pressure-regulating chambers for the first and second pistons to communicate with the check valve, and causing another of the pressure-regulating chambers to be closed, and a spring for urging the pilot valve element toward the solenoid that actuates the pilot valve element.

9. The three-way switching valve according to claim 3, wherein the pilot valve includes a pilot valve element disposed to have both ends thereof protruded from both end faces of a plunger of the solenoid, a first valve seat formed on an end face of a core of the solenoid in a manner opposed to one end of the pilot valve element and having a valve hole communicating with the pressure-regulating chamber for the first piston, a second valve seat disposed in a manner opposed to another end of the pilot valve element and having a valve hole communicating with the pressure-regulating chamber for the second piston, and a passage for causing spaces bounded by the both end faces of the plunger to communicate with the check valve.

10. The three-way switching valve according to claim 9, wherein the pilot valve element is a needle having conical both ends and axially movably disposed along an axis of the plunger in a state where an amount of protrusion toward the second valve seat is restricted, the pilot valve element being urged by a spring in a direction in which the pilot valve element moves away from the first valve seat formed on the core.

11. The three-way switching valve according to claim 10, wherein the needle is divided in two.

12. The three-way switching valve according to claim 9, wherein the main valve element of the first main valve and the first piston, and the main valve element of the second main valve and the second piston are juxtaposed for parallel forward and backward motion, the solenoid is arranged such that the plunger moves forward and backward in a direction perpendicular to a direction of motion of the first and second pistons.

13. The three-way switching valve according to claim 3, wherein the pilot valve includes pilot valve elements disposed on both end faces of a plunger of the solenoid, a first valve seat formed on an end face of a core of the solenoid in a manner opposed to one of the pilot valve elements and having a valve hole communicating with the pressure-regulating chamber for the first piston, a second valve seat disposed in a manner opposed to another of the pilot valve elements and having a valve hole communicating with the pressure-regulating chamber for the second piston, and a passage for causing spaces bounded by the both end faces of the plunger to communicate with the check valve.

14. The three-way switching valve according to claim 13, wherein the first valve seat or the second valve seat has a valve hole communicated with the pressure-regulating chamber for the first piston or the pressure-regulating chamber for the second piston by a tube.

* * * * *